United States Patent
Amin et al.

(10) Patent No.: US 10,645,575 B2
(45) Date of Patent: May 5, 2020

(54) USER PROFILING PREVENTION IN PERSONAL AREA NETWORK COMMUNICATION

(71) Applicant: Telefonaktiebolaget LM Ericsson (publ), Stockholm (SE)

(72) Inventors: Parth Amin, St Albans (GB); Mohit Sethi, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 76 days.

(21) Appl. No.: 15/763,950

(22) PCT Filed: Oct. 12, 2016

(86) PCT No.: PCT/SE2016/050982
§ 371 (c)(1),
(2) Date: Mar. 28, 2018

(87) PCT Pub. No.: WO2017/069678
PCT Pub. Date: Apr. 27, 2017

(65) Prior Publication Data
US 2018/0288611 A1  Oct. 4, 2018

Related U.S. Application Data (60) Provisional application No. 62/243,760, filed on Oct. 20, 2015.

(51) Int. Cl.
*H04L 29/06* (2006.01)
*H04W 12/02* (2009.01)
(Continued)

(52) U.S. Cl.
CPC ............ *H04W 12/02* (2013.01); *G09C 5/00* (2013.01); *H04L 9/0822* (2013.01);
(Continued)

(58) Field of Classification Search
CPC ....... H04L 9/0822; H04L 9/12; H04L 63/123; H04W 12/02; H04W 4/80
(Continued)

(56) References Cited

U.S. PATENT DOCUMENTS

2003/0144894 A1* 7/2003 Robertson .............. G06Q 10/06
  709/226
2004/0064568 A1* 4/2004 Arora ....................... H04L 29/06
  709/228

(Continued)

FOREIGN PATENT DOCUMENTS

WO  WO 2014/139850 A1   9/2014
WO  WO 2015/073966 A1   5/2015

OTHER PUBLICATIONS

Scarfone, "Recommendations of the National Institute of Standards and Technology", Aug. 2008, NIST, pp. 14-26 (Year: 2008).*

(Continued)

*Primary Examiner* — Alexander Lagor
*Assistant Examiner* — Gregory A Lane
(74) *Attorney, Agent, or Firm* — Sage Patent Group (57) ABSTRACT

The present disclosure relates to methods and arrangements for protecting the integrity of subscribers to personal area networks.
This object is obtained by a method, performed in a service subscribing node of a personal area network, for discovering a service providing node. The method comprises obtaining a service identity resolving key. A discovery signal is received from a service publishing node, and a service identifier of the service providing node is determined from a service identity comprised in the received discovery signal using the service identity resolving key.

16 Claims, 7 Drawing Sheets

(51) Int. Cl.

| | | |
|---|---|---|
| *H04L 9/08* | (2006.01) | |
| *H04W 12/00* | (2009.01) | |
| *H04W 4/00* | (2018.01) | |
| *H04L 9/32* | (2006.01) | |
| *G09C 5/00* | (2006.01) | |
| *H04W 4/80* | (2018.01) | |
| *H04L 9/12* | (2006.01) | |
| *H04W 8/00* | (2009.01) | |
| *H04W 12/04* | (2009.01) | |
| *H04W 12/10* | (2009.01) | |
| *H04W 84/18* | (2009.01) | |

(52) U.S. Cl.
CPC .......... *H04L 9/0866* (2013.01); *H04L 9/0891* (2013.01); *H04L 9/12* (2013.01); *H04L 9/3215* (2013.01); *H04L 9/3236* (2013.01); *H04L 9/3242* (2013.01); *H04L 63/123* (2013.01); *H04W 4/00* (2013.01); *H04W 4/80* (2018.02); *H04W 8/005* (2013.01); *H04W 12/00* (2013.01); *H04W 12/04* (2013.01); *H04W 12/10* (2013.01); *H04L 2209/38* (2013.01); *H04W 84/18* (2013.01)

(58) Field of Classification Search
USPC .......................................................... 713/171
See application file for complete search history.

(56) References Cited

U.S. PATENT DOCUMENTS

| | | | | |
|---|---|---|---|---|
| 2006/0123114 | A1* | 6/2006 | Aoki | H04L 12/1467 709/226 |
| 2011/0004762 | A1* | 1/2011 | Horn | H04W 12/04 713/171 |
| 2011/0153773 | A1 | 6/2011 | Vandwalle et al. | |
| 2011/0153818 | A1 | 6/2011 | Vandwalle et al. | |
| 2014/0269555 | A1 | 9/2014 | Sadasivam et al. | |
| 2015/0143122 | A1* | 5/2015 | Abraham | H04L 9/3239 713/170 |
| 2015/0229671 | A1 | 8/2015 | Boss et al. | |
| 2015/0319614 | A1* | 11/2015 | Cho | H04L 9/3247 726/7 |
| 2017/0295484 | A1* | 10/2017 | You | H04W 4/80 |

OTHER PUBLICATIONS

International Search Report and Written Opinion of the International Searching Authority for PCT/SE2016/050982 dated Dec. 29, 2016, 15 pages.

"Neighbor Awareness Networking Technical Specification," version 1.0, Wi-Fi Alliance, 98 pages, May 1, 2015.

"Wi-Fi Neighbor Awareness Networking (NAN) Technical Specification," version 1.0 r20, Wi-Fi Alliance, 231 pages, 2016.

Camps-Mur et al., "Enabling Always on Service Discovery: WiFi Neighbor Awareness Networking," IEEE Wireless Communications, 8 pages, Apr. 2015.

Wi-Fi Aware, http://www.wi-fi.org/discover-wi-fi/wi-fi-aware, 6 pages, Dec. 29, 2016.

IEEE Std. 802.11ac™-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications. Amendment 4: Enhancements for Very High Throughput for Operation in Bands below 6GHz, 425 pages, Dec. 2013.

Supplementary European Search Report for European Patent Application No. 16857880.5 dated Sep. 24, 2018, 5 pages.

* cited by examiner

USER PROFILING PREVENTION IN PERSONAL AREA NETWORK COMMUNICATION

CROSS REFERENCE TO RELATED APPLICATION

This application is a 35 U.S.C. § 371 national stage application of PCT International Application No. PCT/SE2016/050982, filed on Oct. 12, 2016, which itself claims priority to U.S. Provisional Application No. 62/243,760 filed Oct. 20, 2015, the disclosure and content of both of which are incorporated herein by reference in their entireties.

TECHNICAL FIELD

The present disclosure relates to methods and arrangements in service subscribing and service publishing nodes of a personal area network and in particular to methods and arrangements for protecting the integrity of the users.

BACKGROUND

Device-to-device, D2D, communications over social channels, e.g. as an underlay to cellular networks, have been proposed as a means to take advantage of the proximity of communicating devices. Recently, there has been a rise in the use of radio technologies to provide a distribution medium between devices in the same neighborhood. Neighbor Awareness Networking (NAN) is a wireless personal area network technology designed by Wi-Fi Alliance to provide wireless connectivity over so-called social channels. In such a setting, devices may scan the social channels to discover other user devices or wireless access points (APs) with which to synchronize. NAN (aka Wi-Fi Aware) enables power efficient discovery of nearby information (devices, people, access points) and services (with always-on Wi-Fi), using device-to-device communication. Devices that want to communicate directly, or even just discover each other, typically need to transmit various forms of control signaling. One example of such direct control signaling is a so-called discovery signal, also known as a beacon signal, which at least carries some form of identity and is transmitted by a device that wants to be discoverable by other devices. Other devices can scan for the beacon signal. Once the devices have detected the beacon, they can take the appropriate action, for example, to try to initiate a connection setup with the device transmitting the beacon. NAN will make it easy to find services available in the area that match preferences set by the user—and is optimized to work well even in crowded environments. A large number of NAN devices is expected to be out in the market by the end of 2015. More details can be found at http://www.wi-fi.org/discover-wi-fi/wi-fi-aware and https://www.wi-fi.org/file/neighbor-awareness-networking-technical-specification-v10-0 (Section 1 and 2 covers Introduction and Architecture of NAN).

NAN device is defined as a mobile handset/laptop or any other communication device certified by the Wi-Fi Alliance Wi-Fi Aware program. The communication between NAN devices is based on the 802.11n physical layer, which operates at 2.4 GHz and 5 GHz carrier frequencies. The NAN specification defines new MAC mechanisms to support the cluster formation, master selection within a cluster, cluster discovery and acquiring synchronization within a cluster, cluster selection and merging, NAN service discovery protocol, etc. The NAN protocol supports the formation of a cluster and maintaining time synchronization within the cluster based on transmissions of NAN synchronization beacons. A NAN master device transmits NAN discovery beacons to announce the existence of the cluster to the neighbors, who are not part of NAN cluster. A NAN device transmits NAN-related signals. Recently, there has been a rise in the use of radio technologies, such as IEEE 802.11 and 3GPP LTE, to provide a distribution medium between devices in the same neighborhood.

Devices with fixed MAC addresses can be detected and tracked. The tracking can correlate location information and other performances to accurately identify the user, the user's friends, and his favorite applications. The building of social networks or social relations among people who, for example, offer services, share interests, contacts, activities, backgrounds, or real-life connections is expected to grow with the D2D communication. For such networking, each user has to reveal his/her profile (service offering) to the nearby devices to be linked to them. User identities are to be protected according to legal requirements and/or the involved use case, such as where NAN is being used by members of a presidential campaign team.

NAN specification (release 1) provides some privacy by the support of local NAN Interface Addresses, which may be occasionally changed. There is a need to support data transfer capability along with the existing capability to publish/subscribe to the services in more privacy protected and secure manner. Furthermore, there is a need to avoid user profiling based on service identity, ID, transmission in NAN service discovery frames. Service identity list attribute is transmitted by the STAs as a part of NAN Synchronization and Discovery beacons, which consists of a list of services being offered by the cluster in the form of a hash value of the service name/identifier, i.e., a service identity. Also STAs within the cluster transmit NAN service discovery frames which carry a service descriptor attribute consisting of service identifier; service identity/service ID is hash of service name, service information that depends on application and not specified in the specification, service control field that indicates if the Service Descriptor attribute corresponds to Publish, Subscribe, or Follow-up function and if other optional fields are present in the Service Descriptor attribute such as Matching Filter, Service Response Filter, and Service specific information.

One problem related to preserving privacy between two users sharing personal information is to allow sharing of personal information only if there is a matching of the common information between the two users.

However, there is a general need in the state-of-the-art of D2D networking, e.g. social networking, to avoid user profiling to protect privacy i.e. preventing a malicious entity (e.g. application, station, user equipment) to form a list of stations providing the specific service and/or a list of stations subscribed to the specific service. Such user information profiling may be against the privacy laws and also may be used for targeting profile based advertisements.

SUMMARY

It is an object of the present disclosure to provide methods and arrangements that seek to mitigate, alleviate, or eliminate one or more of the above-identified disadvantages and deficiencies in the art and to provide methods and arrangements for protecting the integrity of subscribers to personal area networks.

This object is obtained by a method, performed in a service subscribing node of a personal area network, for discovering a service providing node. The method comprises obtaining a service identity resolving key. A discovery signal is received from a service publishing node, and a service identifier of the service providing node is determined from a service identity comprised in the received discovery signal using the service identity resolving key.

Thus, the service subscribing node as well as the service publishing node, e.g., the service providing node, benefit from anonymity and are protected from eavesdropping activities by unauthorized users while enabling discovery for authorized new subscribers through provisioning of the service identity resolving key, e.g., a priori to attempting the device to device connection. The service identifier, e.g., service name or other type of service information for the service providing node, is protected through the use of a shared secret, i.e., the service identity. Thereby privacy of the service providers and subscribers are protected and user profiling is avoided.

According to an aspect of the disclosure, the method further comprises transmitting the service identity of the service providing node in an access request to the service publishing node. Accordingly, establishing of a integrity protected personal area network is enabled through the disclosed solution.

According to an aspect of the disclosure, the personal area network is a network deploying Neighbor Awareness Networking, NAN, Bluetooth Low Energy, BLE, or LTE ProSe.

According to another aspect of the disclosure, the service identity resolving key comprises an identity update interval that indicates an updating periodicity for generating an updated service identity and a reference time for use of a default service identity that the updated service identities are generated from by means of the service identity resolving key.

Changes in the service identity and/or service information avoids other devices from creating a user profiling i.e. a list of devices offering the service and list of devices getting the services.

The object of the disclosure is also obtained by a service subscribing node configured to discover a service providing node in a personal area network. The service subscribing node comprises a communications interface and processing circuitry. The processing circuitry is configured to obtain a service identity resolving key; receive, from a service publishing node, a discovery signal; and determine a service identifier of the service providing node from a service identity comprised in the received discovery signal using the service identity resolving key.

The object of the disclosure is also obtained by a computer-readable storage medium, having stored thereon a computer program which, when run in a service subscribing node of a personal area network, causes the service subscribing node to perform the above-disclosed method.

The present disclosure also relates to a method, performed in a service publishing node, of allowing discovery of a service providing node of a personal area network. The method comprises obtaining a service identity resolving key and transmitting a discovery signal including a service identity, the service identity being generated from a service identifier of the service providing node using the service identity resolving key.

The object of the invention is also obtained through a service publishing node configured to generate a periodically updated private addresses to be used for addressing messages from a service subscribing node to a service providing node in a personal area network. The service publishing node comprises a communications interface and processing circuitry. The processing circuitry is configured to obtain a service identity resolving key. Furthermore, the processing circuitry is configured to transmit a discovery signal including a service, the service identity being generated from a service identifier of the service providing node using the service identity resolving key.

The object of the disclosure is also obtained through a computer readable storage medium, having stored thereon a computer program which, when run in a service providing node of a personal area network, causes the service publishing node to perform the above-disclosed method.

The disclosed methods, nodes and computer readable storage mediums will provide the benefits of anonymity for nodes that are connected in personal area network deploying the use of a service identity resolving key as mentioned above; providing eavesdropping protection while enabling access to authorized new subscribers through provisioning of the service identity resolving key, e.g., apriori to attempting the device to device connection.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Aspects of the present disclosure will be described more fully hereinafter with reference to the accompanying drawings. The methods and arrangements disclosed herein can, however, be realized in many different forms and should not be construed as being limited to the aspects set forth herein. Like numbers in the drawings refer to like elements throughout.

The terminology used herein is for the purpose of describing particular aspects of the disclosure only and is not intended to limit the invention. As used herein, the singular forms "a", "an" and "the" are intended to include the plural forms as well, unless the context clearly indicates otherwise.

Figure 1:
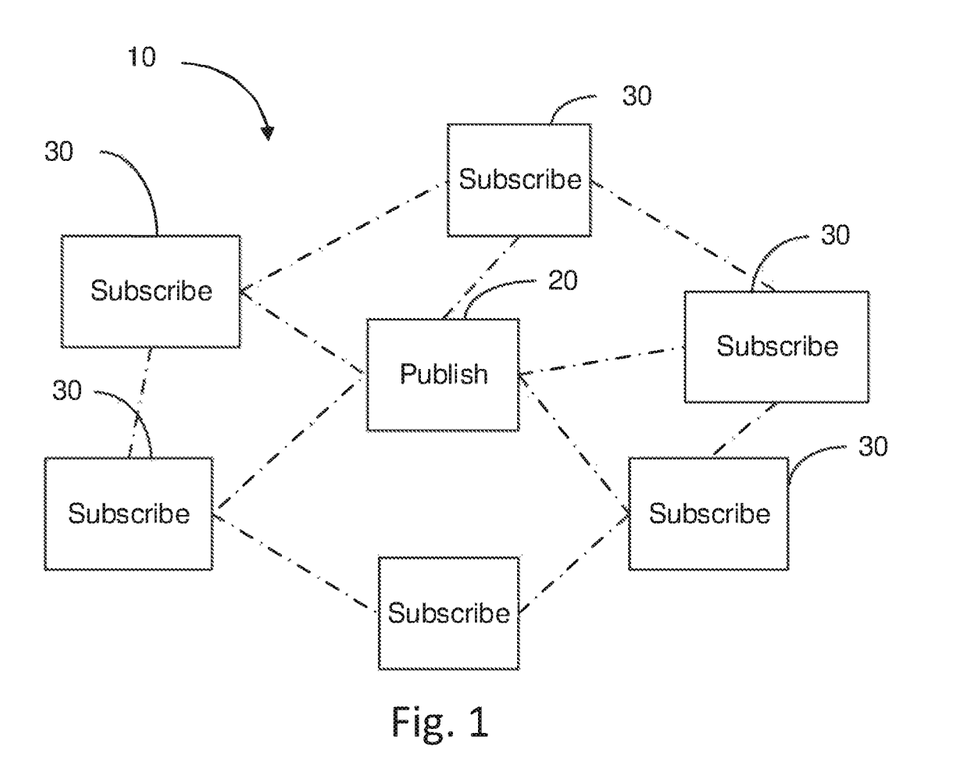
FIG. 1 illustrates a personal area network cluster, e.g. a NAN cluster.

FIG. 1 discloses a personal area network 10, e.g. a Neighbor Awareness Network, NAN. The personal area network comprises a plurality of service subscribing nodes 30 and at least one service publishing node 20. The service publishing node transmits, e.g., broadcasts, NAN discovery beacons to announce the existence of the cluster to devices that are not already part of the NAN cluster. The NAN devices transmit NAN service discovery frames to either publish or subscribe to services within a cluster. When setting up a NAN cluster, e.g. corresponding to a social network, each service subscriber needs to reveal information to neighboring devices in order to connect to these devices in the cluster. The cluster formation of NAN devices in the neighborhood is automatic, as soon as a NAN enabled feature is activated in a NAN device, the NAN radio is designed to remain in always on mode to discover new APs and services.

There is a general need in the state-of-the-art of device to device, D2D, social networking, i.e., a personal area network established based on social network relations, to avoid user profiling to protect privacy i.e. preventing a malicious entity (e.g. application, station, user equipment) to form a list of stations providing the specific service and/or a list of stations subscribed to the specific service. Such user information profiling may be against the privacy laws and also may be used for targeting profile based advertisements.

Figure 2:
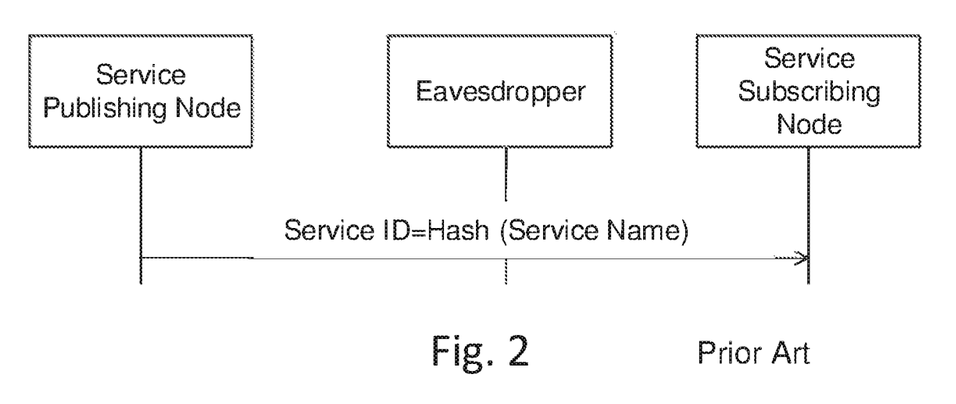
FIG. 2 illustrates prior art transmission of Service ID.

FIG. 2 illustrates a prior art transmission of service identity/service ID between a service publishing node and a service subscribing node. The transmission of the service ID is performed in front of an eavesdropper. The eavesdropper can listen to the NAN device transmission consisting of a Hash of the service name, i.e. a service ID, and over time profile the service publisher.

The service ID is a cryptographic hash of the service name. This service ID is transmitted by the device as part of synchronization/Discovery beacon/Service discovery frame, as depicted in FIG. 2. This creates a privacy problem where an eavesdropper can over time observe the transmissions of publish and subscribe discovery beacons from various devices in the cluster and create a profile for them based on these observations.

Figure 3:
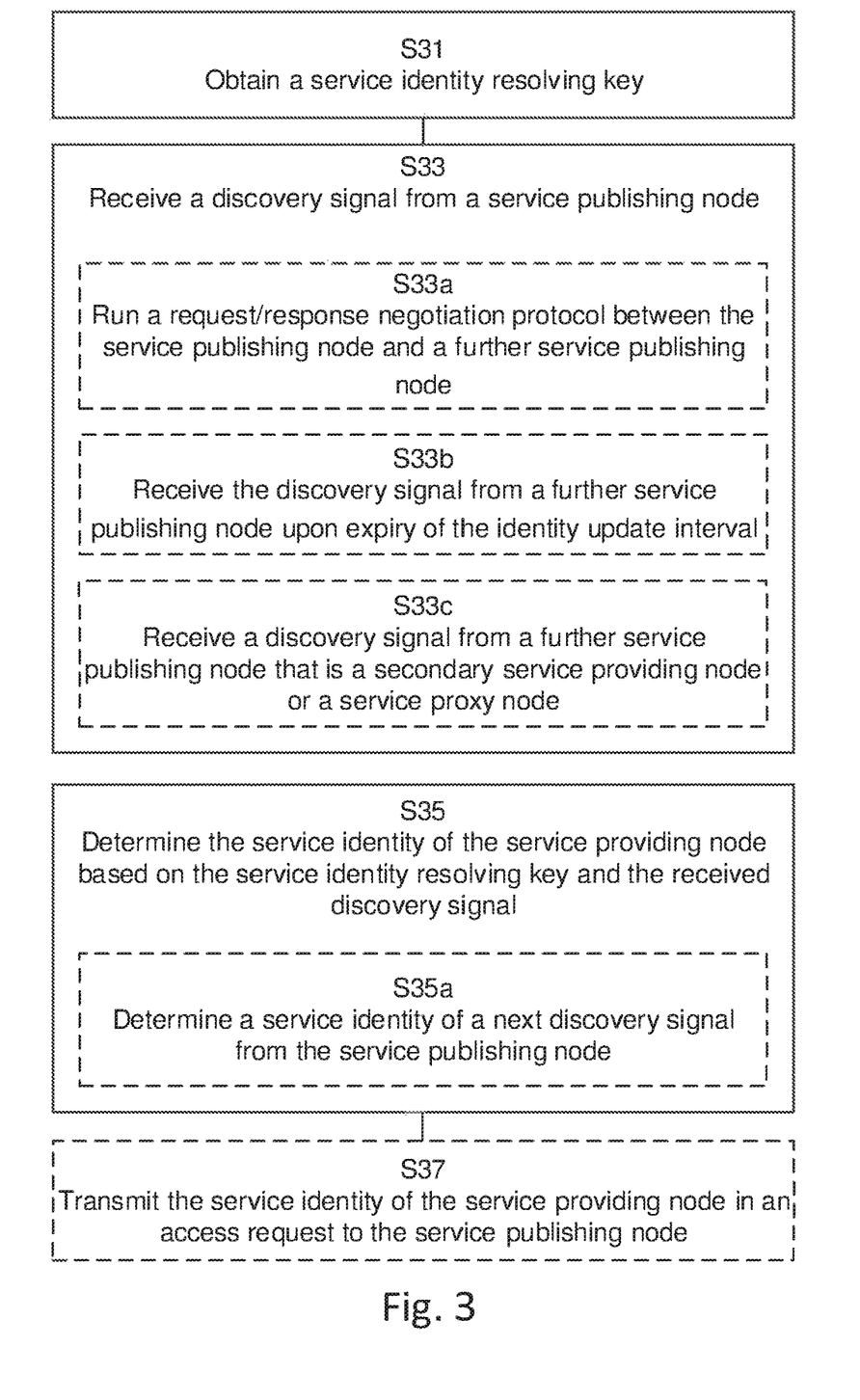
FIG. 3 is a flowchart illustrating embodiments of method steps in a service subscribing node.

FIG. 3 is a flowchart illustrating embodiments of method steps for accessing a service providing node. The method steps are performed in a service subscribing node of a personal area network. Even though primarily disclosed for a personal area network deploying Neighbor Awareness Networking, NAN, in the following description of embodiments, the general concept of the disclosure is applicable also for other types of device to device network where there is a need for integrity protection of the participating device, e.g., personal area networks deploying Bluetooth Low Energy, BLE, or LTE ProSe.

The method comprises to obtain S31 a service identity resolving key, e.g. in an a priori procedure performed upon entry within a community or upon subscription to a service, content or social network. The service subscribing node receives S33 a discovery signal from a service publishing node. The service publishing node transmits or broadcasts discovery signals, e.g., NAN discovery beacons to announce the existence of a personal area network, i.e. a cluster of connected devices, to neighbors who are not yet part of the cluster. The service publishing node determines S35 a service identifier of the service providing node, e.g., a service name or other type service information representative of the service providing node, from a service identity included in the received discovery signal using the service identity resolving key. More specifically, the service identity resolving key is required to resolve the service identity included in the discovery signal.

According to an aspect of the disclosure, the service subscribing node then transmits S37 the service identity in an access request to the service publishing node. The access request message includes the service identity of the service providing node, wherein the service identity has been generated using the service identity resolving key. According to aspects of the disclosure, the service subscribing node transmits NAN service discovery frames to either publish or subscribe to services within a cluster.

Examples of NAN synchronization and discovery beacon frame format are available in the NAN Release 1 specification and reference is made to this specification for further information on the various prior art formats used when setting up a device to device connection between nodes of a NAN network.

According to aspects of the disclosure, the service publishing node is an original service providing node, e.g. a NAN master managing a NAN cluster, a secondary service providing node taking over responsibility of providing the service from an original service providing node or a service proxy node being an intermediary node between the service providing node and the service subscribing node. Thus, according to an aspect of the disclosure, the receiving of a discovery signal, alternatively or additionally, comprises receiving S33b a discovery signal from a further service publishing node upon expiry of an identity update interval or receiving S33c a discovery signal from a further service publishing node that is a secondary service providing node or a service proxy node. According to aspects of the disclosure, a number of options for obtaining S31 the service identity resolving key are considered, e.g. by using offline channels. Such offline channels could include printed information on a paper, e.g. a QR-code, distributed to authorized subscribers. Service identity represents a cryptographic hash of the service name.

According to an aspect of the disclosure, the service identity resolving key is obtained from the service publishing node. The service identity resolving key can also be received in a pairing operation with the service publishing node. During this operation, two devices interested in the service are securely paired together. There are many well-known methods of secure device pairing such as entering the same pin-codes in the two devices. Any device interested in the service provided by the service providing node would in an initial pairing operation receive the service identity resolving key from a device already having an established NAN connection with the service publishing node.

According to another aspect of the disclosure, the service identity resolving key comprises an identity update interval that indicates an updating periodicity for generating an updated service identity and a reference time for use of a default service identity that the updated service identities are generated from by means of the service identity resolving key. According to an aspect of the disclosure, the service identity represents a cryptographic hash of the service identifier and the update frequency determines how often the hashes in a hash chain are to be calculated. The reference time represents, e.g., the UTC time at which the shared secret and security parameters were created. This enables later subscribers to the service to discover the service providing node.

According to a further aspect of the disclosure, the receiving of the discovery signal comprises receiving S33a the discovery signal from a further service publishing node upon expiry of the identity update interval. In order to further anonymize the service provisioning and the NAN grouping related to this service, the device originally providing the service for a predetermined amount of time can enlist the help of another device subscribing to the same service.

As mentioned above, the service publishing node could according to some aspects of the disclosure be the service providing node. This represents the embodiment where a NAN device itself transmits/broadcasts the service identifier of the offered or subscribed services. In alternative embodiments, a NAN device transmits/broadcasts the service offering on behalf of the service provider.

According to an aspect of the disclosure, the determining S35 of the service identifier of the service providing node comprises determining S35a the service identifier from a service identity comprised in a next discovery signal from the service publishing node.

Figure 4:
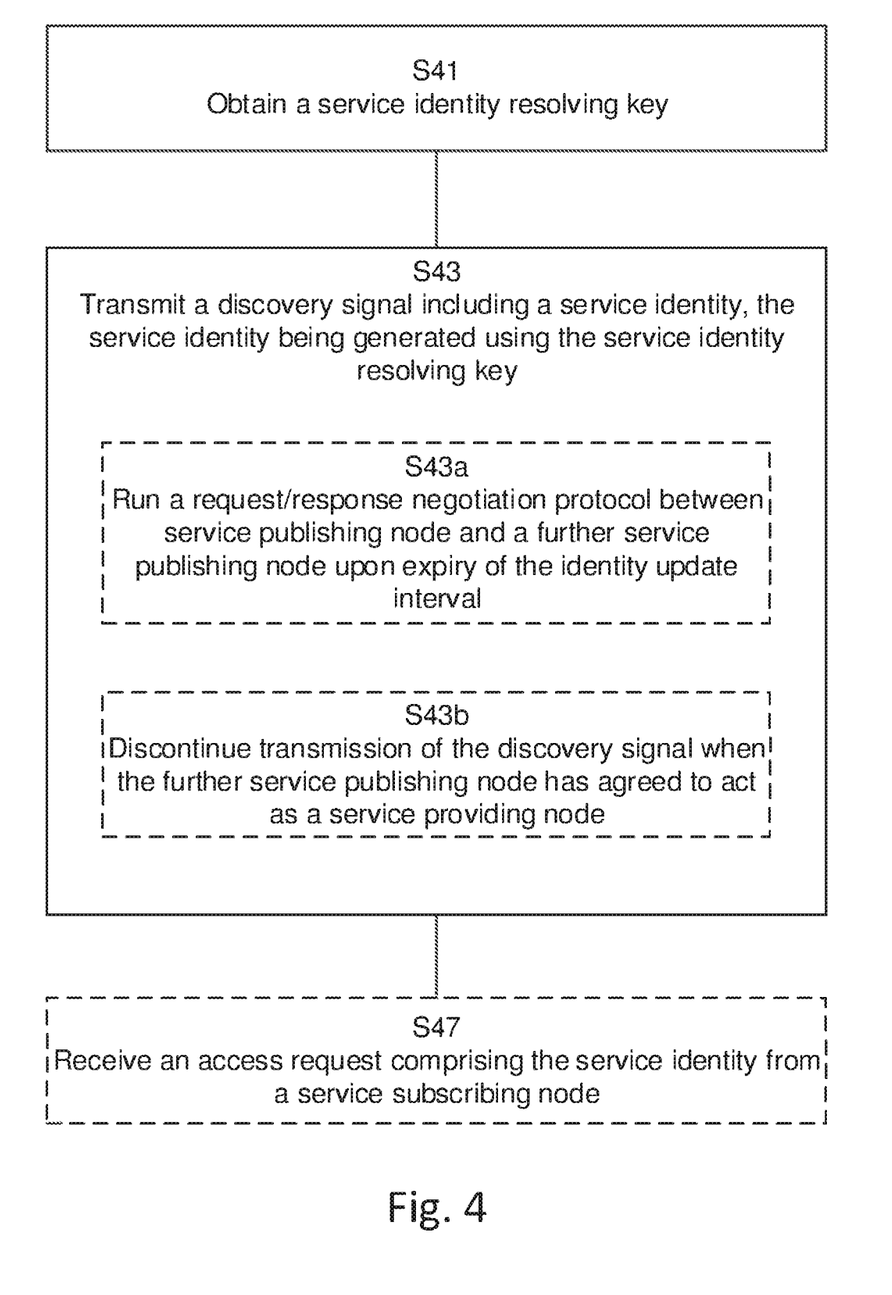
FIG. 4 is a flowchart illustrating embodiments of method steps in a service publishing node.

FIG. 4 is a flowchart illustrating embodiments of method steps in a service publishing node. The method steps are performed in a service publishing node of a personal area network. Even though primarily disclosed for a personal area network deploying Neighbor Awareness Networking, NAN, in the following description of embodiments, the general concept of the disclosure is applicable also for other types of device to device network where there is a need for integrity protection of the participating device, e.g., personal area networks deploying Bluetooth Low Energy, BLE, or LTE ProSe. The method comprises to obtain S41 service identity resolving key, e.g. in an apriori procedure performed upon entry within a community or upon subscription to a service, content or social network. The service publishing node transmits S43, e.g., broadcasts, a discovery signal including a service identity, the service identity being generated from a service identifier of the service providing node using the service identity resolving key. The discovery signals are for example NAN discovery beacons, transmitted or broadcasted to announce the existence of a personal area network, i.e., a cluster of connected devices, to neighbors who are not yet part of the cluster.

According to an aspect of the disclosure, the service publishing node receives S45 an access request comprising the service identity of the service providing node from a service subscribing node that attempts to set up a device to device connection to the service publishing node.

According to aspects of the disclosure, the service publishing node is an original service providing node, e.g. a NAN master managing a NAN cluster, a secondary service providing node taking over responsibility of providing the service from an original service providing node or a service proxy node being an intermediary node between the service providing node and the service subscribing node. According to aspects of the disclosure, a number of options for obtaining the service identity resolving key are considered, e.g., by using offline channels. Such offline channels could include printed information on a paper, e.g. a QR-code, distributed to authorized subscribers. Service identity represents a cryptographic hash of the service name.

According to an aspect of the disclosure the service identity resolving key comprises an identity update interval that indicates an updating periodicity for generating an updated service identity and a reference time for use of a default service identity from which the updated service identities are generated using the service identity resolving key. According to an aspect of the disclosure, the service identity represents a cryptographic hash of the service identifier and the update frequency determines how often the hashes in a hash chain are to be calculated. The reference time represents, e.g., the UTC time at which the shared secret and security parameters were created. This enables later subscribers to the service, i.e., service subscribing nodes, to discover the service providing node.

The method of any of the previous embodiments, wherein the service publishing node is the service providing node, e.g. a master of a NAN cluster formed in correspondence with a social network, e.g. based on, shared interests, contacts, activities, backgrounds, or real-life connections.

According to a further aspect of the disclosure, the method further comprises to run S43a request/response negotiation protocol between the service publishing node and a further service publishing node upon expiry of the identity update interval. The transmission, e.g., broadcasting, of the discovery signal from the service publishing node is discontinued S43b when the further service publishing node has agreed to act as a service providing node. Hence, onion routing is foreseen to provide further anonymity to the NAN group.

According to a further aspect of the disclosure, the determining of the service identity of the service providing node comprises determining a service identity of a next discovery signal from the service publishing node.

The method of any of the preceding embodiments, wherein the determining of the service identity of the service providing node comprises determining a service identity of a next discovery signal from the service publishing node.

Figure 5A:
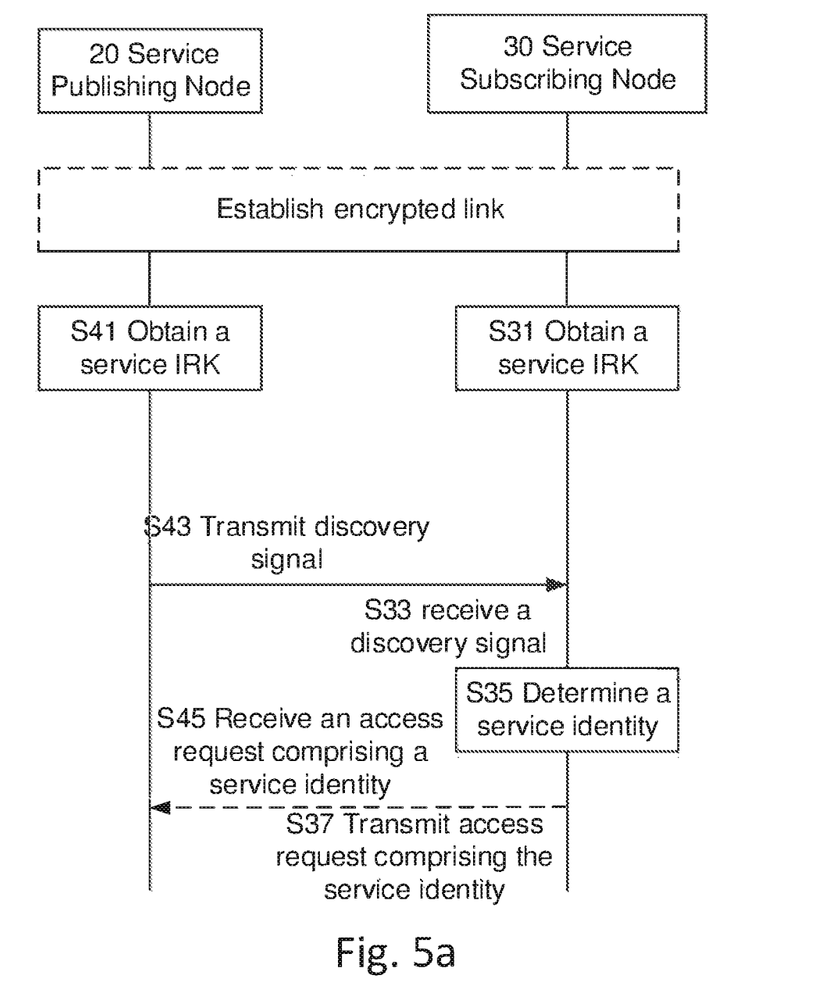
FIG. 5a is a signaling diagram illustrating exchange of signals between service subscribing nodes and a service publishing node.

FIG. 5a is a signaling diagram illustrating exchange of signals between service subscribing nodes and a service publishing node. The signaling diagram discloses the exchange between the publishing node and a subscribing node when joining the subscribing node to the cluster.

FIG. 5a illustrates signaling using a hash chain and a shared secret to derive the service name, i.e., service identifier, being advertised/searched. This requires that the shared secret and other security parameters between service provider stations and service consumer stations are distributed a-priori. In S31 and S41, performed in the service publishing node as well as in the service subscribing node, a service identity resolving key is obtained. The NAN station offering the service, i.e., a service providing node or a service publishing node would transmit, e.g., broadcast, S43 the service identity (i.e., a hash of service name) in a discovery signal. The service publishing node receives the discovery signal and determines S35 a service identifier of the service providing node, e.g., a service name and possibly other service information aspects related to the social network that the service providing node represents, from the service identity comprised in the received discovery signal. The service identifier may itself be a keyed cryptographic hash of the original service name. Further, the NAN device/station providing the service may keep calculating and updating the service identity as the keyed cryptographic of the previously advertised service identity. The update frequency is pre-shared to all the members as part of the security parameters distributed a-priori. The service subscribing node may respond to the discovery signal by transmitting S37 an access request. This access request, comprising the service identity, is received S45 in the service publishing node.

Another NAN device may transmit/broadcast the service offering on behalf of the service providing node. In the figure, this has been illustrated by a service publishing node that may represent a service providing node, a proxy of a service providing node or any other type of intermediary node. This approach may also avoid user profiling, where NAN device itself does not transmit the service identity of the offered or subscribed service.

Example Embodiment 1

According to an aspect of the present disclosure, use of a hash chain and a shared secret to derive the service identifier, i.e., Service Name, being advertised/searched is proposed. This requires that a shared secret and other security parameters are distributed a-priori between a service publishing node, e.g., a service provider station, and service subscribing nodes, also known as service consumer stations.

Other security parameters may include:
  The original service name or shared nonce based on which the new Service names will be derived.
  The update frequency of the service name, i.e., how often would the hashes in the chain is calculated.
  The UTC time at which the shared secret and security parameters were created. This is necessary to allow new members who are interested in the service and have received the shared secret and parameters at a later point of time can still discover the service.

There are a number of different ways to share the secret and associated security parameters and the present disclosure is not limited to any of these ways. This could for example be done by using offline channels (e.g. printing a secret on paper with a QR code and distributing it only to authorized consumers). Care must be taken so as to prevent in-advertent disclosure to other malicious nodes as it would allow them to discover the service name and track the service provider.

This shared secret and associated security parameters are not used for encrypting any traffic. Nor is this secret used for authenticating and authorizing devices. This secret is only used to generate new service names, i.e., new service identities that can be deciphered and discovered by peers that know the secret. Of course, malicious user devices may still subscribe to all known/un-known services and it is up to the service provider to authenticate and distinguish valid service requests from invalid ones.

The shared secret could also be distributed by securely pairing the devices interested in the service together. Many well-known methods of secure device pairing such as entering the same pin-codes two devices etc. are available. Any device that is interested in the service would first have to be securely paired with a device that is already part of the service group and receive the shared secret and other information.

Figure 5B:
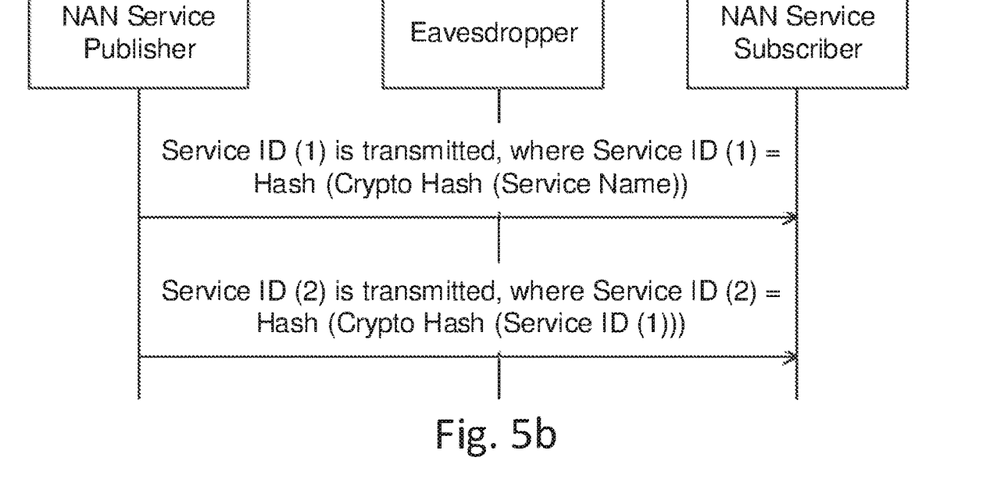
FIG. 5b is a signaling diagram highlighting aspects of an embodiment of the present disclosure.

FIG. 5b is a signaling diagram highlighting the discovery beacons, i.e., broadcasted discovery signals of the above discussed example embodiment 1. User profiling in NAN is avoided by changing transmission/broadcasting of the service identity, Service ID, at the agreed time interval, based on pre-shared cryptographic key information.

An example use case of our invention may be the presidential election campaign mobile app. In this scenario, only people from one political party will learn about the shared secret and parameters and would then be a NAN to discover services with other people who have the similar political beliefs. Other stations that do not have knowledge of this secret would not know about what service is being published and subscribed.

The station offering the service would transmit/broadcast the service identity as a keyed cryptographic hash of the original service identifier, e.g., service name or common agreed nonce. Therefore, Service Name=$HSS$(common nonce/original service name).

The Service ID, as mentioned in the NAN standard is derived as the hash of the Service Name. Therefore ServiceID=$H$(Service Name)

From henceforth, the device/station providing the service would keep calculating and updating the Service Name as the keyed cryptographic of the previous Service Name advertised. The update frequency is known to all the members as part of the security parameters distributed a-priori.

If a device/station, i.e., a service subscribing node, intends to discover and subscribe to a service at a later point of time, it would use the shared secret and the original service name/common nonce along with the UTC time at which the secret was generated, as well as the update frequency to continuously calculate the current position in the hash chain. It would then search for this service name and corresponding service ID.

Service Name at any given point is of the form:

$H_{ss}(H_{ss}(H_{ss}(\text{shared nonce/original service name})))$.

Another important thing to note here is that NAN already provides and necessitates strict time-synchronization between devices in a cluster to avoid a scenario where devices lose synchronization.

Example Embodiment 2

While the approach in the above-disclosed embodiment avoids user profiling based on transmitted service identity, service ID, other devices that do not have the secret would still know that there is an entity in the NAN cluster that is offering some service that is being subscribed to by other entities in the cluster.

Thus, further privacy insurance could be achieved by using onion routing, i.e., the group that has the shared secret can also anonymize the publishing/subscription using onion routing. Once the original service providing node or station has provided the service for a certain amount of time, it can enlist the help of another device that has the shared secret and is currently subscribed to this service.

These two stations would then run a request/response negotiation protocol. Once the negotiation is over, the secondary station enters the role of a service publishing node publishing service identity and the original service providing node would stop transmitting/broadcasting the service discovery beacons. The service publishing node continues the provisioning, i.e., transmission or broadcasting, of the service identity (and updates it according to the original frequency using the same shared secret).

Any service request received by the newly advertising station is then directed towards the original station that is no longer sending service discovery beacons but is still responsible for providing the service.

The device advertising on behalf of the original service provider can at a later point of time handover the job of publishing the service identity to the original service providing node or another trusted device.

Figure 5C:
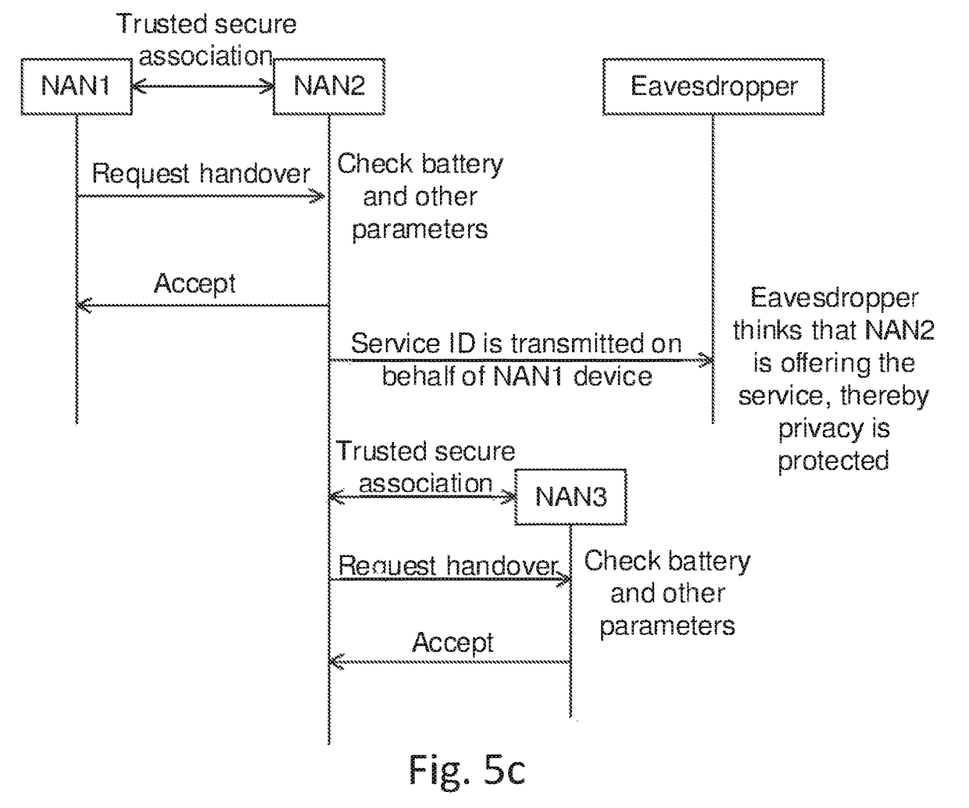
FIG. 5c is another signaling diagram highlighting aspects of another embodiment of the present disclosure.

This is illustrated in the signaling diagram of FIG. 5c. NAN2 device is publishing the service on the behalf of NAN1 device, i.e., the service providing node, thereby avoiding user profiling by an eavesdropper. NAN 1-3 in this figure represent nodes alternating in the roles of service publishing nodes, wherein NAN 1 is the original service providing node.

Example Embodiment 3

While in the previous embodiment, the service is always offered by the original station, i.e., service providing node, in another scenario, the secondary node that has accepted the responsibility of service publishing node, transmitting or broadcasting the service identity, would also act as a service proxy. In this case, the secondary station, i.e., service publishing node, forwards the service request to the service providing node and upon receiving a response; it forwards it to the service consumer, i.e., service subscribing node.

Example Node Configurations

Figure 6:
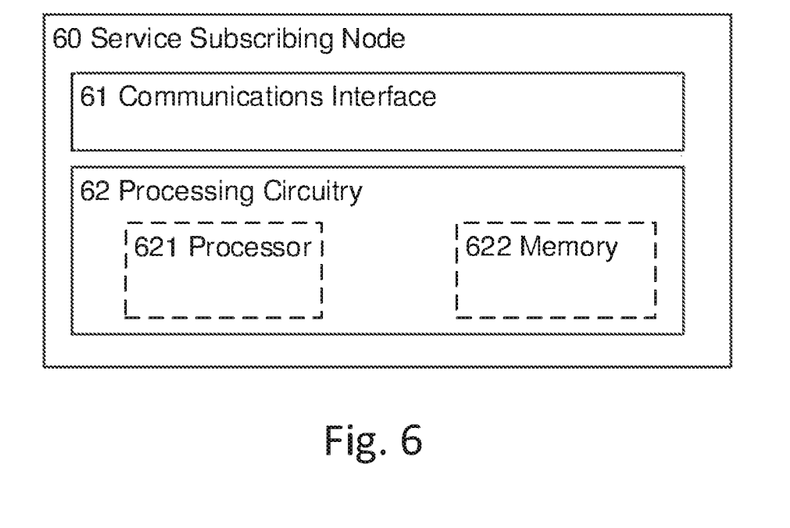
FIG. 6 is an example node configuration of a service subscribing node, according to some of the example embodiments.

FIG. 6 illustrates an example of a service subscribing node which may incorporate some of the example embodiments discussed above. As shown in FIG. 6, the service subscribing node 60 may comprise a communications interface 61 configured to receive and transmit any form of communications or control signals within a network. It should be appreciated that the communications interface 61 may be comprised as any number of transceiving, receiving, and/or transmitting units or circuitry. It should further be appreciated that the communications interface 61 may be in the form of any input/output communications port known in the art. The communications interface 61 may comprise RF circuitry and baseband processing circuitry (not shown).

The service subscribing node 60 further comprises processing circuitry 62, e.g. comprising a memory unit 622 and a processor 621 that may be in communication with the communications interface 61. The processing circuitry is configured to obtain a service identity resolving key, to receive a discovery signal from a service publishing node; and to determine a service identifier of the service providing node from a service identity comprised in the received discovery signal using the service identity resolving key.

The memory 622 may be configured to store received or transmitted data and/or executable program instructions. The memory 622 may be any suitable type of computer readable memory and may be of volatile and/or non-volatile type.

Figure 7:
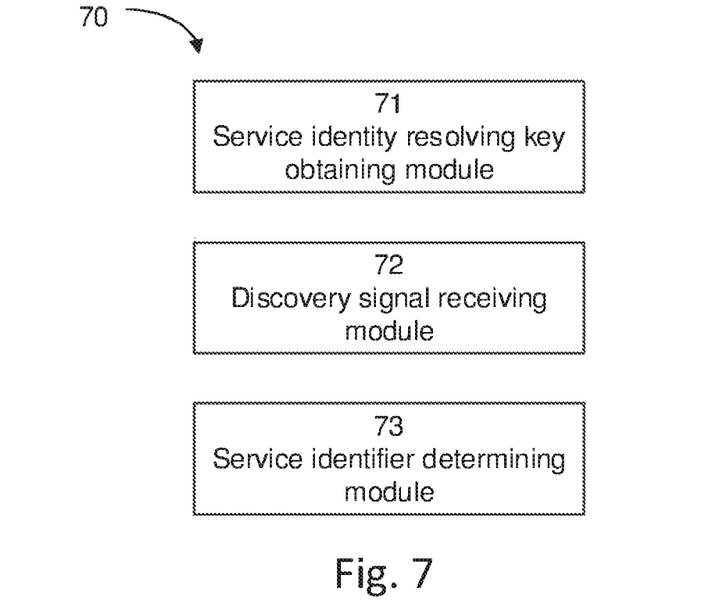
FIG. 7 is an example node configuration of a service subscribing node, according to some of the example embodiments.

FIG. 7 illustrates another example node configuration of a service subscribing node, according to some of the example embodiments. The service subscribing node comprises a service identity resolving key obtaining module 71 configured to obtain a service identity resolving key, a discovery signal receiving module 72 configured to receive a discovery signal from a service publishing node, and a service identity determining module 73 configured to determine a service identifier of the service providing node from a service identity comprised in the received discovery signal using the service identity resolving key. Thus, the modules are configured to perform the above-disclosed method steps.

Figure 8:
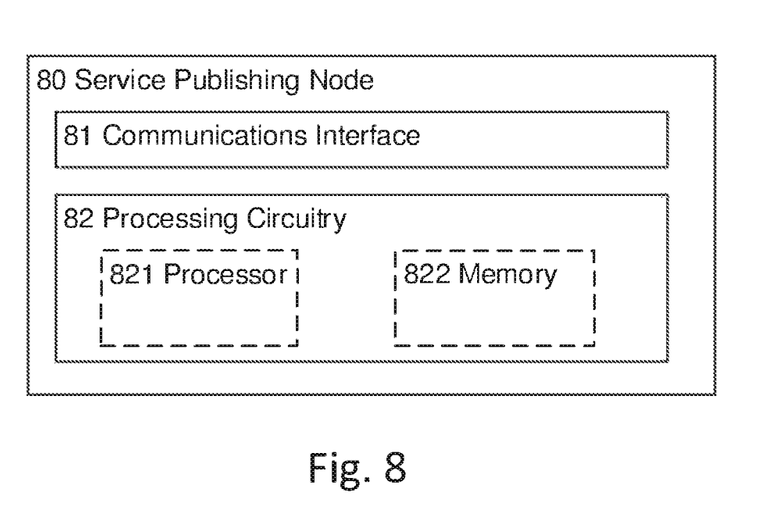
FIG. 8 is an example node configuration of a service publishing node, according to some of the example embodiments.

FIG. 8 illustrates an example of a service publishing node which may incorporate some of the example embodiments discussed above. As shown in FIG. 8, the service publishing node 80 may comprise a communications interface 81 configured to receive and transmit any form of communications or control signals within a network. It should be appreciated that the communications interface 81 may be comprised as any number of transceiving, receiving, and/or transmitting units or circuitry. It should further be appreciated that the communications interface 81 may be in the form of any input/output communications port known in the art. The communications interface 81 may comprise RF circuitry and baseband processing circuitry (not shown).

The service publishing node 80 may further comprise further processing circuitry 82 configured to obtain a service identity resolving key and to transmit a discovery signal including a service identity, the service identity being generated from a service identifier of the service providing node using the service identity resolving key. The service publishing node 80 may further comprise at least one memory unit 822 or processor 821 that may be in communication with the communications interface 81. The memory 822 may be configured to store received or transmitted data and/or executable program instructions.

The processing circuitry 82 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Figure 9:
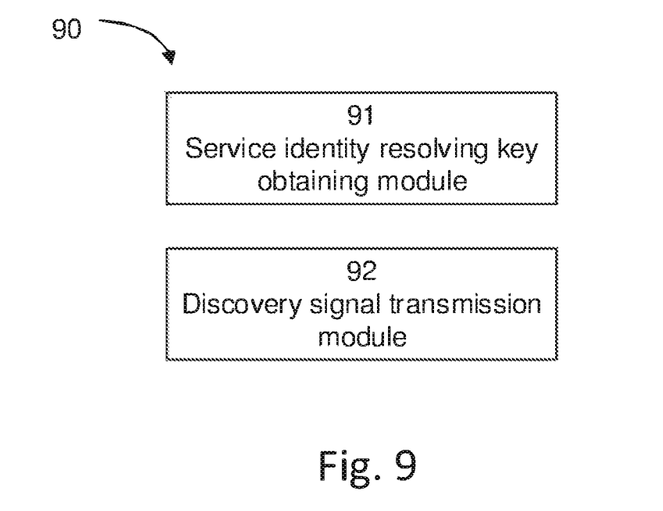
FIG. 9 is an example node configuration of a service publishing node, according to some of the example embodiments.

FIG. 9 illustrates another example node configuration of a service subscribing node, according to some of the example embodiments. The service subscribing node comprises a service identity resolving key obtaining module 91 configured to obtain a service identity resolving key, and a discovery signal transmission module 92 configured to transmit a discovery signal including a service identity, the service identity being generated from a service identifier of the service providing node using the service identity resolving key. Thus, the modules are configured to perform the above-disclosed method steps.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general-purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can, in fact, be executed substantially concurrently, or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from a personal area network deploying NAN has been used herein to explain the example embodiments, this should not be seen as limiting the scope of the example embodiments to only the aforementioned system. Other personal area networks may also benefit from the example embodiments disclosed herein.

Also note that terminology such as service subscribing node and service publishing node should be considered as non-limiting and does in particular not imply a certain hierarchical relation between the two. In general "service subscribing node" could be considered as device 1 and "service publishing node" as device 2 and these two devices communicate with each other over some radio channel.

The description of the example embodiments provided herein has been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "service publishing node" as the term may be used herein, is to be broadly interpreted to include a radiotelephone having ability for personal area network communication, e.g. including or included in any of a web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a service subscribing node of a personal area network, for discovering a service providing node, the method comprising:
   obtaining a service identity resolving key;
   receiving a discovery signal from a service publishing node; and
   determining a service identifier of the service providing node from a service identity comprised in the received discovery signal using the service identity resolving key,
      wherein the service identity resolving key comprises an identity update interval that indicates an updating periodicity for generating an updated service identity and a reference time for use of a default service identity that the updated service identities are generated from by means of the service identity resolving key.

2. The method of claim 1, further comprising:
   transmitting the service identity of the service providing node in an access request to the service publishing node.

3. The method of claim 1, wherein the receiving of the discovery signal comprises receiving the discovery signal from a further service publishing node upon expiry of the identity update interval.

4. The method of claim 1, wherein the receiving of the discovery signal comprises receiving the discovery signal from a further service publishing node that is a secondary service providing node taking over responsibility of providing the service from the original service providing node or a service proxy node being an intermediary node between the service providing node and the service subscribing node.

5. The method of claim 4, further comprising:
   running a request/response negotiation protocol between the service publishing node and the further service publishing node.

6. The method of claim 1, wherein the service identity represents a cryptographic hash of the service identifier.

7. A service subscribing node configured to discover a service providing node in a personal area network, the service subscribing node comprising:
   a communications interface; and
   processing circuitry configured to
      obtain a service identity resolving key;
      receive, from a service publishing node, a discovery signal; and
      determine a service identifier of the service providing node from a service identity, comprised in the received discovery signal, using the service identity resolving key,
         wherein the service identity resolving key comprises an identity update interval that indicates an updating periodicity for generating an updated service identity and a reference time for use of a default service identity that the updated service identities are generated from by means of the service identity resolving key.

8. A method, performed in a service publishing node, for allowing discovery of a service providing node of a personal area network, the method comprising:
obtaining a service identity resolving key; and
transmitting a discovery signal including a service identity, the service identity being generated from a service identifier of the service providing node using the service identity resolving key
wherein the service identity resolving key comprises an identity update interval, that indicates an updating periodicity for generating an updated service identity and a reference time for use of a default service identity from which the updated service identities are generated by means of the service identity resolving key.

9. The method of claim 8, wherein the transmitting comprises broadcasting of the discovery signal.

10. The method of claim 8, further comprising:
receiving an access request comprising the service identity of the service providing node from a service subscribing node.

11. The method of claim 8, wherein the service publishing node is the service providing node.

12. The method of claim 8, further comprising the running of a request/response negotiation protocol between the service publishing node and a further service publishing node upon expiry of the identity update interval; and
discontinuing transmission of the discovery signal when the further service publishing node has agreed to act as a secondary service providing node or a service proxy node being an intermediary node between the service providing node and the service subscribing node.

13. The method of claim 8, wherein the service identity represents a cryptographic hash of the service identifier.

14. A service publishing node configured to generate a periodically updated private addresses to be used for addressing messages from a service subscribing node to a service providing node in a personal area network, the service publishing node comprising:
a communications interface; and
processing circuitry configured to
obtain a service identity resolving key; and
transmit a discovery signal including a service identity, the service identity being generated from a service identifier of the service providing node using the service identity resolving key,
wherein the service identity resolving key comprises an identity update interval that indicates an updating periodicity for generating an updated service identity and a reference time for use of a default service identity that the updated service identities are generated from by means of the service identity resolving key.

15. The method of claim 1, further comprising generating an updated service identity at a periodic rate defined by the identity update interval provided by the service identity resolving key.

16. The method of claim 8 further comprising generating an updated service identity at a periodic rate defined by the identity update interval provided by the service identity resolving key.

* * * * *